United States Patent
Li et al.

(10) Patent No.: US 12,367,730 B2
(45) Date of Patent: Jul. 22, 2025

(54) VENDING MACHINE AND VENDING METHOD FOR SELLING RESTRICTED COMMODITIES BASED ON USER IDENTITIES

(71) Applicant: LUXSHARE PRECISION INDUSTRY COMPANY LIMITED, Shenzhen (CN)

(72) Inventors: HuaBing Li, Shenzhen (CN); Yu Huang, Shenzhen (CN); ZhongYuan Lai, Shenzhen (CN); Jia Yang, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 492 days.

(21) Appl. No.: 17/852,827

(22) Filed: Jun. 29, 2022

(65) Prior Publication Data

US 2023/0005321 A1 Jan. 5, 2023

(30) Foreign Application Priority Data

Jul. 5, 2021 (CN) .......................... 202110757214.3

(51) Int. Cl.
*G07F 9/00* (2006.01)
*G06Q 20/20* (2012.01)
(Continued)

(52) U.S. Cl.
CPC ........... *G07F 9/009* (2020.05); *G06Q 20/203* (2013.01); *G06Q 20/40145* (2013.01);
(Continued)

(58) Field of Classification Search
CPC ........ G07F 9/009; G07F 9/002; G07F 9/0235; G07F 9/105; G07F 9/02; G07F 9/026;
(Continued)

(56) References Cited

U.S. PATENT DOCUMENTS 7,367,049 B1 * 4/2008 Robinson ................ G06F 21/32
713/186
7,631,193 B1 * 12/2009 Hoffman ............... H04L 9/3231
726/4
(Continued)

FOREIGN PATENT DOCUMENTS

CN 107424302 A 12/2017
CN 107622573 A 1/2018
(Continued)

*Primary Examiner* — Michael Collins
(74) *Attorney, Agent, or Firm* — Birch, Stewart, Kolasch & Birch, LLP

(57) ABSTRACT

A vending machine for storing and selling restricted commodities, and a vending method implemented therein. In the vending machine, a control module comprises a processor executing program codes to provide a vending service. A user interface is connected to the control module, comprising a sensor sampling biometric characteristics of a user. A communication module is connected to the control module, comprising a wireless transceiver configured to receive commands from the control module, and communicate with a central system or the user. The control module drives said sensor to capture the biometric characteristics of the user, and then uploads the biometric characteristics to the central system through the communications module. A database storing associations of the biometric characteristics and identity characteristics of users. The control module receives a search result from the database based on the biometric characteristics of the user to determine whether a restricted commodity is authorized for sale.

16 Claims, 4 Drawing Sheets

(51) Int. Cl.
*G06Q 20/40* (2012.01)
*G07F 9/02* (2006.01)
*G07F 9/10* (2006.01)

(52) U.S. Cl.
CPC ............ *G07F 9/002* (2020.05); *G07F 9/0235* (2020.05); *G07F 9/105* (2013.01)

(58) Field of Classification Search
CPC .......... G07F 11/72; G07F 9/023; G07F 11/16; G06Q 20/203; G06Q 20/40145
See application file for complete search history.

(56) References Cited

U.S. PATENT DOCUMENTS

| | | | | |
|---|---|---|---|---|
| 8,200,980 | B1* | 6/2012 | Robinson | G06Q 20/40 713/186 |
| 9,051,162 | B2* | 6/2015 | Peters | G06Q 30/0601 |
| 11,450,168 | B2* | 9/2022 | Ishino | F25D 17/06 |
| 2003/0061172 | A1* | 3/2003 | Robinson | G06Q 20/40145 705/67 |
| 2003/0155417 | A1* | 8/2003 | Fairman | G06Q 30/06 235/381 |
| 2003/0177102 | A1* | 9/2003 | Robinson | G06Q 20/401 705/75 |
| 2006/0122881 | A1* | 6/2006 | Walker | G06Q 30/0247 705/14.46 |
| 2007/0168290 | A1* | 7/2007 | Robinson | G06Q 20/401 705/51 |
| 2007/0235465 | A1* | 10/2007 | Walker | G07F 9/001 221/9 |
| 2017/0228755 | A1* | 8/2017 | Tkachenko | G07F 9/002 |
| 2017/0323278 | A1* | 11/2017 | Unnerstall | G06Q 20/4016 |
| 2019/0164237 | A1* | 5/2019 | Newman | G06Q 50/12 |
| 2019/0251562 | A1 | 8/2019 | Dabiri | |
| 2019/0295354 | A1* | 9/2019 | Chon | G07F 13/065 |
| 2020/0250629 | A1 | 8/2020 | Fernando et al. | |
| 2021/0270541 | A1* | 9/2021 | Ishino | G07F 9/105 |

FOREIGN PATENT DOCUMENTS

| | | |
|---|---|---|
| CN | 108205840 A | 6/2018 |
| CN | 108470304 A | 8/2018 |
| CN | 108765698 A | 11/2018 |
| CN | 108831013 A | 11/2018 |
| CN | 110837765 A | 2/2020 |
| CN | 112184997 A | 1/2021 |
| CN | 112509219 A | 3/2021 |
| TW | M434276 U1 | 7/2012 |
| TW | M539124 U | 4/2017 |
| TW | M571538 U | 12/2018 |
| TW | I651674 B | 2/2019 |
| TW | M619270 U | 11/2021 |

\* cited by examiner

VENDING MACHINE AND VENDING METHOD FOR SELLING RESTRICTED COMMODITIES BASED ON USER IDENTITIES

CROSS REFERENCE TO RELATED APPLICATION

This application claims the priority benefit of Chinese Patent Application Serial Number 202110757214.3, filed on Jul. 5, 2021, the full disclosure of which is incorporated herein by reference.

BACKGROUND

Technical Field

The application relates to a vending machine, and more particularly, to a device and method for vending restricted commodities by determining categories of accessible commodities based on user identities.

Related Art

Cigarettes are age restricted commodities. In present life, cigarettes are available in supermarkets or grocery stores. When administrative management is not in place, people under ages may easily access the age restricted commodities. Cigarettes may significantly affect the growth of the underages. An unattended cigarette vending machine can be adapted to effect cigarettes sales, in combination with technical means for preventing the cigarettes from selling to the under ages, such that various advantages can be rendered, such as significant reduction of cost from daily operation, and reduction of the issuance of licenses for retailors. Therefore, with the development of society and the balance of the game of interests, the cigarette vending machines set up in the stores under supervisions of people, particularly under the epidemic situations, may effectively realize self-serviced and unattended shopping.

However, conventional vending machine may still be awkward in recognizing the legitimate status of the buyers. Therefore, an unattended cigarette vending machine with improved recognition ability remains desirable to be developed.

SUMMARY

The embodiment of the present application provides a vending machine and a vending method implemented on the vending machine, so as to solve the problem in the prior art that user identities cannot be accurately verified to sell restricted commodities.

To solve the above technical problems, this application is implemented through the following technical solutions.

In an embodiment, a vending machine comprises at least a communication module, an inventory module, a cash management module, a user interface, and a control module. The user interface comprises sensors for sampling user biometric characteristics. The communication module is connected to the control module and comprises a wireless transceiver for communicating with the central system or a user. The inventory module is connected to the control module for managing storage, expiration dates and provision of commodities. The cash management module is connected to the control module and is adaptable for managing storage, reception and return of cash. The user interface is connected to the control module, adaptable for interacting with users using images or sounds. The control module comprises a memory device storing program codes, and a processor executing the program codes to control the communication module, the inventory module, and the user interface to provide vending services.

The communication module may upload the user biometric characteristics to the central system. The central system may be a customer service system or a public security system, comprising a database storing associations of biometric characteristics and identity characteristics corresponding to the users.

The control module may receive, through the communication module, a search result of searching the database by the central system according to the biometric characteristics, to determine whether a restricted commodity is authorized for sale. For example, the control module determines whether the user identity characteristic satisfies a first condition according to the search result. When the user identity characteristic satisfies the first condition, the control module generates a command to provide the restricted commodity based on the identity characteristic, so that the user interface allows the restricted commodity to be visible on a commodity menu. When the identity characteristic is undeterminable, the control module does not generate the command to provide the restricted commodity, so that the user interface does not display the restricted commodity on the commodity menu. Alternatively, when the first condition is not met, the restricted commodity may still be displayed but restricted for selection. For example, when an unauthorized user selects the restricted commodity on the commodity menu, a prompt of refusal is displayed.

A commodity menu of selectable commodities may be determined according to the user's identity characteristics. The user interface receives a selection signal from the user, selecting one of the commodities on the commodity menu. Thereafter, the control module starts a payment process for the user to pay the price corresponding to the selected commodity through the communication module or the cash management module. When the payment is successfully performed, the control module instructs the inventory module to provide the commodity selected by the user.

In an embodiment, the sensor may be at least one of a camera, a microphone, a scanner, and a fingerprint sensor. The sensor can be configured by the control module to receive the selection signal from the user selecting the commodities. The biometric characteristics may be facial images, voice, retinal images, or fingerprints respectively sensed by the camera, the microphone, the scanner, the fingerprint sensor, and etc.

In a specific embodiment, the identity characteristic may be the age of users, and relatively, the first condition may be that the age is greater than or equal to a specific threshold, for example, the specific threshold is eighteen years old.

In another embodiment, the communication module is configured to transmit the selection of the commodity to the database of the central system, so that the central system may establish an association with the biometric characteristics of the user as a basis for big data analysis. For example, the big data analysis result may be received by the communication module, and based on which, the control module may be able to recommend via the user interface, new commodity potentially suitable for the user. Such that a customized marketing promotion mechanism is implemented.

In a specific embodiment, the restricted commodity may be cigarettes, and the types may include at least traditional type, non-combustible heated type, and atomized electronic type. As an extra service, the vending machine may also provide a heater controlled by the control module. When the control module generates a command directing the inventory module to provide the cigarettes, the control module also activates the heater for heating the cigarettes.

In a further embodiment, the communication module is in compliance with at least one of the following communication protocols: Bluetooth, Wireless Local Area Network (WLAN), Near Field Communication (NFC), and Radio Frequency Identification (RFID). The control module is configured to provide an electronic payment mode and a cash payment mode. In a payment process, users can choose to use electronic payment or banknotes for the payment. For example, users can choose to use Bluetooth, wireless network, near-end wireless communication on mobile phones, or use a contactless protocol in an IC card or a proximity card with radio frequency identification to pay. Payments can also be performed by Mobile apps, such as WeChat, PayPal, Banks apps, and etc. When the user chooses a traditional banknotes transaction, the vending machine of the embodiment can also be configured with a traditional cash management module to provide the services.

In a further embodiment, the inventory module in the vending machine of the present invention is configured to check remaining commodities in stock. When a number of remaining commodities in stock is lower than a threshold, the communication module in the vending machine sends a low inventory notification to the central system to schedule subsequent replenishment processes. On the other hand, the control module can be configured to detect alerts generated from problematic payments or module damage. The control module sends a warning notification to the central system when the alerts are detected. For example, when someone uses counterfeit banknotes to trade or destroys the hardware of the machine, the vending machine saves the currently captured image data and reports to a customer service system or a public security system through the communication module.

As a further value adding service, when the transaction is successful, the control module may be configured to store the user biometric characteristics and the corresponding selection of commodities, allowing a default selection to be provided for the user when using the vending machine next time.

In a specific embodiment, the user interface may include a console for receiving user selections of commodities on the commodity menu. To facilitate user interaction, the console may be a touch screen. For a console designed by mechanic buttons, the user interface may further use a display or a light board to indicate available commodities. In a further approach, a microphone may be installed in the user interface, allowing the user to orally select commodities.

In another embodiment, the inventory module is configured to track expiration dates of commodities in stock. When one of the commodities is expired, the vending machine may suspend the services in the vending machine or recall the one of the commodities. For example, in the vending machine, in addition to a first channel for providing the commodities to the user, a second channel, such as a recalling channel, may be designed to specifically transport the expired commodities to a recalling area inside the machine body. For example, a recalling bin may be designed, storing the expired commodities pending for removal and destruction by the maintainers. In an alternative embodiment, a destruction module, such as a destruction chamber, is built within the machine body. The expired commodities are redirected into the destruction chamber via the recalling channel, and are destroyed therein.

Furthermore, the vending machine of the present application may include multiple machine bodies, and the machine bodies are respectively electrically connected to the control module. The restricted commodities may comprise multiple types, and the multiple types of restricted commodities are respectively stored in the multiple machine bodies.

In another aspect of the application, a vending method is implemented in the vending machine. The steps of the vending method are summarized as follows.

Firstly, the user biometric characteristics are sampled. Thereafter, the user biometric characteristics are uploaded to the central system. The central system may include a database that correlates the biometric characteristics and the identity characteristics. When the vending machine receives a search result of searching the database based on the biometric characteristics by the central system, the user identify characteristic is determined based on the search result. When the user identity characteristic satisfies a first condition, for example, at least 18 years old, a restricted commodity, such as cigarettes, can be displayed on the commodity menu. Conversely, when the user's identity characteristics is undeterminable in the database, or the user is under eighteen years old, the purchase of cigarettes is not allowed, and in this case, the restricted commodity is not displayed on the commodity menu. A payment process was processed after selection of the commodities. Specifically, the vending machine accepts the user to select a commodity on the commodity menu. After deciding on the commodity, the payment process is started. The user pays the corresponding price according to the selected commodity. When the payment process is successfully performed, the vending machine provides the commodity selected by the user to complete the transaction.

In another embodiment, the vending machine comprises a heater, and the vending method further comprises: after generating the command to provide the restricted commodity, activating the heater to heat the restricted commodity.

In another embodiment, the vending method comprises checking remaining commodities in stock; and when a number of the remaining commodities is lower than a threshold, sending a low inventory notification to the central system through the communication module.

In another embodiment, the vending method comprises detecting alerts generated from problematic payments or module damage; and sending a warning notification to the central system when the alerts are detected.

In another embodiment, the vending method comprises storing associations of the biometric characteristics and the selection signal on the commodities.

In another embodiment, the vending method further comprises tracking expiration dates of the commodities in stock; and when one of the commodities is expired, suspending services in the vending machine or recalling the one of the commodities.

The subsequent steps of the vending method have been introduced in the foregoing embodiment of the vending machine, therefore the details are not repeated herein. The advantage of the present application is the provision of a multifunctional autonomous vending machine capable of accurately recognizing user identities according to user biometric characteristics, allowing an authorized user to legitimately purchase their favorite cigarettes, wherein the types of the cigarettes include traditional type, non-combustible heated type, and atomized electronic type. Labor costs are reduced. The association with the national public security service provides protections for under-ages, and maintain transactions of commodities traceable and controllable.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
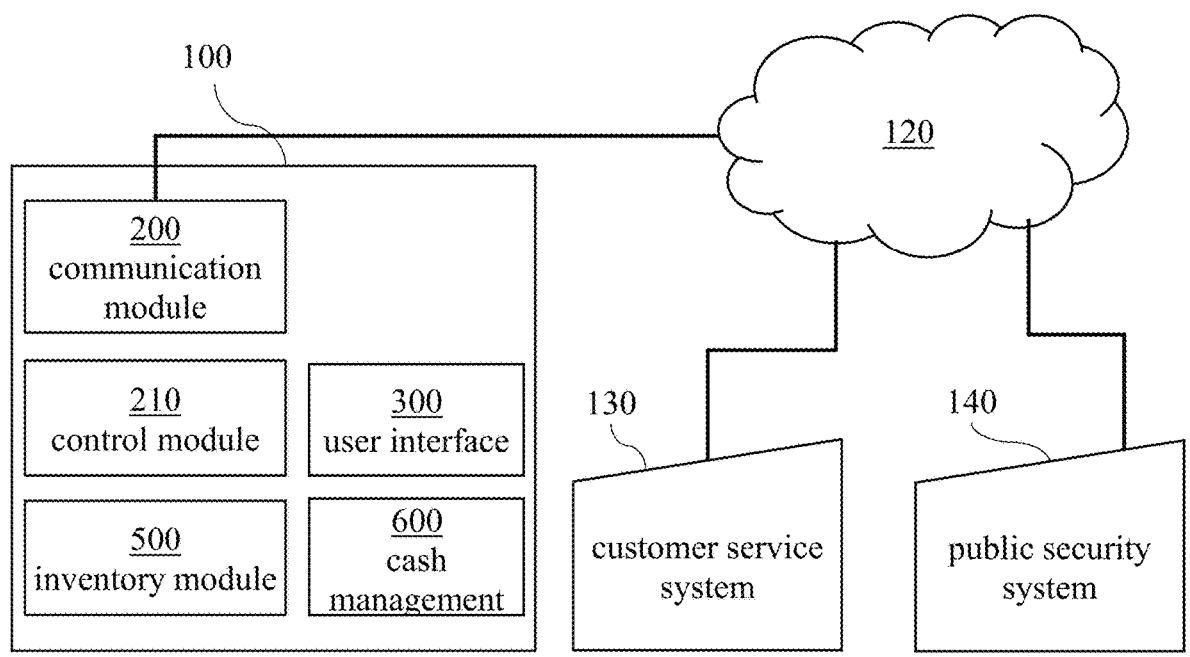
FIG. 1 shows a systematic architecture diagram of a vending ecosystem according to an embodiment of the application.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/comprising" and "comprise/comprising" are used in an open-ended fashion, and thus should be interpreted as "comprising but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. When no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

The technical solutions in the embodiments of the present application will be described clearly and completely with reference to the accompanying drawings in the embodiments of the present application. Obviously, the described embodiments are part of the embodiments of the present application, rather than all of them. Based on the embodiments in this application, all other embodiments obtained by those of ordinary skill in the art without creative work shall fall within the protection scope of this application.

FIG. 1 shows a systematic architecture diagram of a vending ecosystem according to an embodiment of the application.

Around the corners of many streets and alleys of a city, vending machines are commonly seen in both outdoors and indoors environments. A vending machine 100 may be connected to the Internet 120 through a communication module 200, and is remotely connected to a central system. For example, the central system may be a customer service system 130 of the manufacturer, or a public security system 140. In an embodiment of the vending machine 100, various function blocks are implemented, including at least a communication module 200, an inventory module 500, a cash management module 600, a user interface 300, and a control module 210.

The communication module 200 in FIG. 1 is connected to the control module and is mainly used for external communication. For example, a connection can be established with wire or wirelessly to the Internet 120, so as to communicate with the central system remotely. The central system here is generally referred to as a customer service system 130 provided by the manufacturer, the vendors, or the cigarette administration authorities, and can also be referred to as the public security system 140. The inventory module 500 in FIG. 1 is connected to the control module 210, and the inventory module 500 is adaptable for storing commodities, monitoring the expiration dates of the commodities, and providing commodities. The commodity provision module has been implemented by a large number of existing technologies, and this embodiment is only an improved application based on it, so the details of the mechanism will not be described in detail.

In the customer service system 130 or the public security system 140 in FIG. 1, a database related to biometric characteristics and identity characteristics may be prepared. For example, in the central systems, a database of user facial images, and corresponding ID numbers and ages can be built. When the communication module 200 in FIG. 1 receives a search result performed by the central system based on the biometric characteristics (i.e., facial images), the control module 210 can determine the commodities that are allowed to be sold to the user. The control module 210 can generate a command according to the determination, instructing the inventory module 500 to provide an age restricted commodity based on the identity characteristic. For example, it is determined whether the current user identity characteristics meet a condition. When the user identity characteristic satisfies the condition, the control module 210 allows the inventory module 500 to provide the restricted commodity, and directs the user interface 300 to display the restricted commodity on a commodity menu for the user to purchase. The so-called condition in the embodiment is that the user has to be an adult. The condition may be that the age is greater than or equal to a specific threshold. The specific threshold is, for example, a legal age of majority. Satisfying the condition means meeting the condition of adulthood. The legal age of majority in most countries is referred to as the age of eighteen or older, but it may also be sixteen or twenty. Relevant restrictions can be adjusted by the program codes according to different regulations is various jurisdictions.

In contrast, when the user identity characteristic is undeterminable, or does not satisfy the first condition, the control module 210 does not allow the provision of the restricted commodities. In this case, the user interface does not display the restricted commodity on the commodity menu. Alternatively, the user interface may still display the restricted commodity to unauthorized users, but would prompt a refusal to select when the restricted commodity is selected.

The restricted commodities here can be cigarettes or alcohol, and can also include beverages or other types. The embodiment of the vending machine can be extended to a structure of multiple machine bodies connected to each other, wherein each machine body stores and sells different types of commodities.

The fundamental principle of recognizing the identity characteristic based on the biometric characteristics to authorize accessibilities of the restricted commodities can be extended to various other embodiments. For example, the central system, such as the customer service system 130, may be a website with memberships dedicated to a specific group of people, such as a dedicated host for employees within a company, or a dedicated host within a school. The vending machines 100 may be placed in specific communities, such as campuses. Therefore, only the identities of specific ethnic groups, such as students or faculty members, can be verified and get the opportunity to purchase. For example, only students can get preferential discounts, or limited-edition commodities that are only suitable for VIP members to snap up. It is to be understood that a variety of possible applications can be enabled based on the aforementioned embodiments of the vending machine.

The cash management module 600 in FIG. 1 is connected to the control module 210, mainly responsible for the details of traditional cash payment, such as the reception, anti-counterfeiting, storage, change return and anti-theft of copper banknotes. The traditional cash payment implemented in unattended vending machines have been implemented by a large number of traditional technologies. The embodiment is an improved application based thereon, and therefore the details about the cash management module may not be thoroughly elaborated herein.

The user interface 300 in FIG. 1 is connected to the control module, responsible for receiving user inputs and outputting messages to the user. The information input by the user generally comprises images, input commands, voice, and biometric characteristics. The message output to the user is mainly in the forms of video and/or sound. In other words, the user interface 300 as a whole is an interface that interacts with users visually and acoustically.

The control module 210 in FIG. 1, is generally referred to as a program-controlled computer system comprising a processor, and a memory device for storage of program codes. The processor executes the program codes to control the communication module 200, the inventory module 500, the cash management module 600, and the user interface 300 so as to provide vending services.

When the commodities to be displayed on the commodity menu are determined according to a user's identity characteristics, the user interface 300 of FIG. 1 displays the commodity menu in front of the user, allowing the user to select and purchase the commodities. A payment process is initiated by the control module 210 when the user selects a commodity, wherein a variety of options to pay are provided. For example, online payment or contactless payment can be implemented through the communication module 200, or alternatively, a traditional cash payment can be performed through the cash management module 600. When the payment is successfully completed, the control module 210 instructs the inventory module 500 to provide the commodity selected by the user. For example, the commodity can be provided through a product retrieval window.

Figure 2:
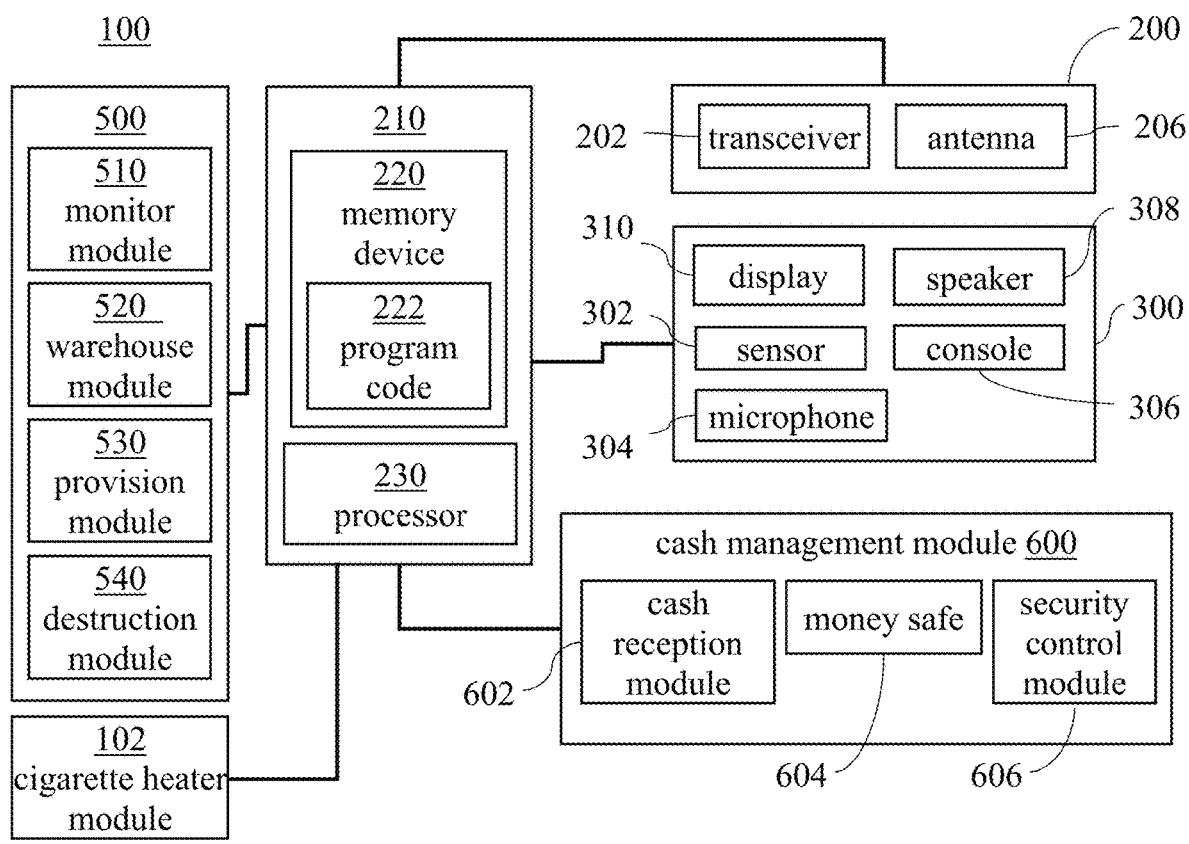
FIG. 2 shows a configuration diagram of a vending machine according to an embodiment of the application.

FIG. 2 shows a configuration diagram of a vending machine according to an embodiment of the application. In this embodiment, the vending machine 100 in FIG. 1 is further broken down for illustration. The control module 210 in FIG. 2 can be regarded as a kernel based operating system. The implementation method is similar to a general computer, with a processor 230 that executes program codes stored in the memory device 220 to control all peripheral modules. The communication module 200 in FIG. 2 can be roughly classified as comprising an antenna 206 and a transceiver 202. It can be equipped with a phone number for 4G or 5G wireless transmission. On the other hand, the communication module 200 can also be connected to the Internet 120 through a wired network, and is eventually routed to the central system. In the embodiment, the central system may be the customer service system 130 and/or the public security system 140. In a further implementation, a connection between the communication module 200 and the central system may be established on a virtual private network (VPN) to reinforce data security.

In FIG. 2, a user interface 300 is presented for interactions with users as described. One of the main functions is to sample the user biometric characteristics. The sampling process can be implemented in many different ways, either individually or jointly. For example, the biometric characteristics of users can be sampled by a sensor 302 or a microphone 304 in the interface 300. When the sensor 302 is a camera, the user's facial image is sampled as the biometric characteristics. The sensor 302 may also be implemented as a retinal scanner for sampling images of the user's retina. Alternatively, the sensor 302 may be a fingerprint sensor for collecting fingerprints of the user. Furthermore, the user's voice received by the microphone 304 may also be taken as the biometric characteristics. The various kinds of biometric characteristics, individually or selectively combining, may be uploaded and profiled in the central system, rendering a database for big data analysis. In this way, the unattended vending machines can be widely deployed in major cities across the country to enhance customer service and precise marketing.

The user interface 300 in FIG. 2 also comprises a console 306, a speaker 308, and a display 310. The display 310 may be a liquid crystal display or a light-emitting diode display to present abundant visual information for user interactions. The console 306 may be a touch screen or a physical button, serving as a control interface for the user when using the vending service. The speaker 308 is adaptable for broadcasting sounds, such as voice guidance during a purchase process, or playing advertisements on the display 310 to attract users to stay. Although the above-mentioned sensor 302, microphone 304, console 306, speaker 308 and display 310 are classified as user interface 300, they are only for easy understanding of readers. In implementation, each module may feature different functions, cooperatively working together with the communication module 200 under control of the module 210. The embodiments of the modules and blocks in FIG. 2 are merely functional descriptions not intended to constrain the physical implementations. For example, the microphone 304 is not only used for collecting user's vocal characteristics for biometric characteristic identification, the microphone 304 can also be used to receive user voice that are recognizable in the control module 210 to perform an alternative input approach, such as an advanced interactive purchase process in addition to the touch input or button input via the console 306. For example, when choosing a commodity, a user can orally order the desired commodity in a spoken language. As soon the control module 210 recognizes the voice received by the microphone 304, a transaction can be performed.

In a transaction process, the communication module 200 can transmit the data of the commodity selected by the user to the database of the central system, based on which, the central system establishes an association with the user biometric characteristics as the basis of big data analysis. For example, the biometric characteristics of the users, the selection of the commodity, and corresponding identity characteristic are all recorded in the central system. Going forward, the social researchers may be able to determine whether certain commodities affect healthiness of the public based on the correlation between commodity preference and personal health records. Furthermore, the big data analysis result may be provided from the central system to the control module 210 through the communication module 200, allowing the control module 210 to determine new commodities recommendable to the user. The recommendation of new commodities can be displayed by the user interface 300. In other words, a user customized marketing/promotion mechanism can be implemented based on the big data analysis. As an additional function, when the transaction is successfully completed, the control module 210 may store the user biometric characteristics and the corresponding selection of commodities, that is, to remember the user's face and the purchased commodity. When the user uses the vending machine 100 again, the last purchased commodities may be presented as a default selection to facilitate the transaction process.

In a specific embodiment, the restricted commodity is referred to as cigarettes, with various types including at least traditional type, non-combustible heated type, and atomized electronic type. A value adding service may be further provided with the embodiment. A cigarette heater module 102 can be deposited in the vending machine 100, controlled by the control module 210 to ignite or heat the purchased cigarettes. When the inventory module 500 provides the cigarettes to the user, the control module 210 may activate the cigarette heater module 102 for the user to ignite the purchased cigarettes.

As mentioned above, the vending machine 100 of the embodiment provides multiple options to pay. Payments through contactless technology or mobile applications are both supported. For example, the communication module 200 in the vending machine 100 may support at least one of the following communication protocols: Bluetooth, WLAN (Wireless Fidelity; Wi-Fi), NFC, or RFID. In implementations of contactless payments, users may choose to use the Bluetooth, WLAN, NFC on the mobile phone, or IC cards and proximity cards with RFID, to make payments through the communication module 200 using a contactless protocol. In addition, the vending machine 100 comprises a display 310 configured to display not only the commodity menu. During a payment process, the display 310 also displays two-dimensional barcodes for the mobile app such as WeChat or bank apps to make the payment. When the user chooses to pay by traditional cash, the vending machine 100 of the embodiment is also equipped with a traditional cash management module to perform the transaction.

The cash management module 600 in FIG. 2 enables a traditional way of payment by cash. The basic operation comprises a cash reception module 602, adaptable for receiving coins or banknotes while determining the authenticities thereof. The money safe 604 is reinforced with enhanced security and is adaptable for storing received cash. To process change returning, a mechanism to spit the changes can be deployed. A security control module 606 is adaptable for monitoring whether the integrity of the cash management module 600 is compromised. Once any module in the cash management module 600 is found affected by external forces or malfunctions, the communication module 200 is immediately triggered to issue a warning to the central system. In specific implementation of the cash management module 600, a large number of known technologies have been existed. The embodiment is an enhanced application based on the know art, and therefore the detailed descriptions are omitted herein.

In a further embodiment of the vending machine 100, the inventory module 500 is adaptable for checking remaining commodities in stock. The function blocks in the inventory module 500 can be subsequently subdivided into a monitor module 510, a warehouse module 520, a provision module 530, and a destruction module 540. The warehouse module 520 is a device that actually stores the commodities. The monitor module 510 monitors the number of remaining commodities of each type stored in the warehouse module 520. After the user completes the payment, the provision module 530 retrieves the selected commodity from the warehouse module 520, and then provides the selected commodity through a cigarette exporting gate on the vending machine 100. Every time a commodity is sold, a corresponding commodity counter in the monitor module 510 is decremented. When the number of remaining commodity of any type in the warehouse module 520 is lower than a threshold, the communication module 200 in the vending machine 100 is triggered to send a low stock notification to the central system, so that the customer service system can schedule a subsequent replenishment process. The monitor module 510 can be implemented by a mechanically triggered counter. To enable the capability to recognize the barcodes on the box of the commodity, an intelligent design of the monitoring function may be implemented with a microprocessor and a sensor executing a particular software application. The monitor module 510 in the embodiment of the present invention is therefore based on the intelligent design, such that the inventory module 500 is enabled to track the expiration dates of the commodities in stock. An expiration date is generally displayed on the barcodes of a box, and the monitor module 510 in this embodiment is designed to calculate the total number of commodities when the commodities are loaded into the warehouse module 520, and simultaneously scan the barcodes on the box. The expiration dates encoded in the barcodes on the box of each commodity may be stored in the memory device 220. As the days go by, when any commodity in the warehouse module 520 is expired, the vending machine 100 can stop the vending service, or automatically destroy/recall the expired commodity. For example, in the provision module 530 of the vending machine 100, in addition to a channel providing commodities to users, a dedicated channel for destruction can also be designed, and a destruction module 540 can pick up the expired commodity from the warehouse module 520 and transfer them to a recalling bin, in which the expired commodities are tentatively stored until removal by the maintainer. In a further implementation, a simple destruction chamber, such as a paper shredding mechanism, or a small incinerator, can be built in the destruction module 540 to achieve the purpose of destroying the expired commodities.

Both the inventory module 500 and the cash management module 600 in FIG. 2 are most vulnerable to theft attack, and therefore a self-protection mechanism is crucial. When the control module detects that there is a payment abnormality during the user's operation, or that any insurance module in the vending machine 100 is damaged or functionally abnormal, the communication module 200 is triggered to immediately send a warning notice to the central system. For example, when someone uses counterfeit cash to trade, or destroys the machine hardware in the inventory module 500 and/or the cash management module 600, the vending machine 100 may record the biometric characteristics sampled by the sensor 302 at the moment, and report to the customer service system 130 and/or the public security system 140 through the communication module 200.

Figure 3:
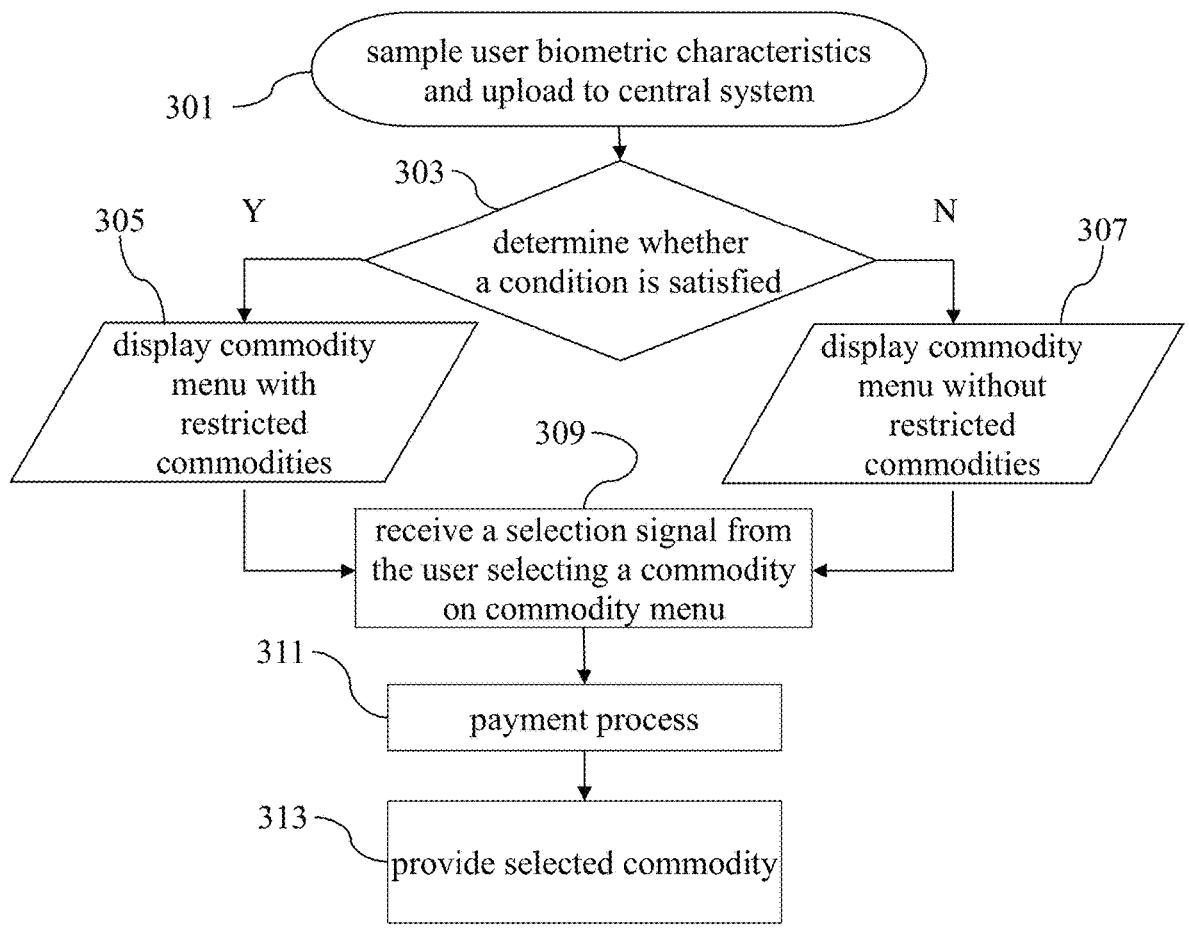
FIG. 3 is a flowchart of the vending method according to an embodiment of the application.

FIG. 3 is a flowchart of the vending method according to an embodiment of the application. The principle of operations based on the architecture of the vending machine 100 introduced in FIGS. 1 and 2 can be summarized as the flowchart in FIG. 3. Firstly, in step 301, a sensor 302 in FIG. 2 samples the user biometric characteristics. The vending machine 100 uploads the sampled user biometric characteristics to the central system. In step 303, the communication module 200 receives a search result of the central system searching the database according to the biometric characteristics, and the control module 210 determines whether the user's identity characteristics meet a condition. When the condition is met, the process goes to step 305, wherein the restricted commodities are displayed on the commodity menu of the display 310. On the other hand, when the condition is not met, or the identity is undeterminable, step 307 is performed, wherein the restricted commodity is not displayed on the commodity menu of the display 310. In either case, step 309 is processed, wherein a selection signal is generated by the user selecting a commodity on the commodity menu displayed on the display 310. When the commodity is selected, the payment process of step 311 is processed. Finally, when the payment is successfully completed in step 313, the selected commodity may be provided to the user through a cigarette exporting gate on the cigarette vending machine 400 by the provision module 530 of FIG. 2.

Figure 4:
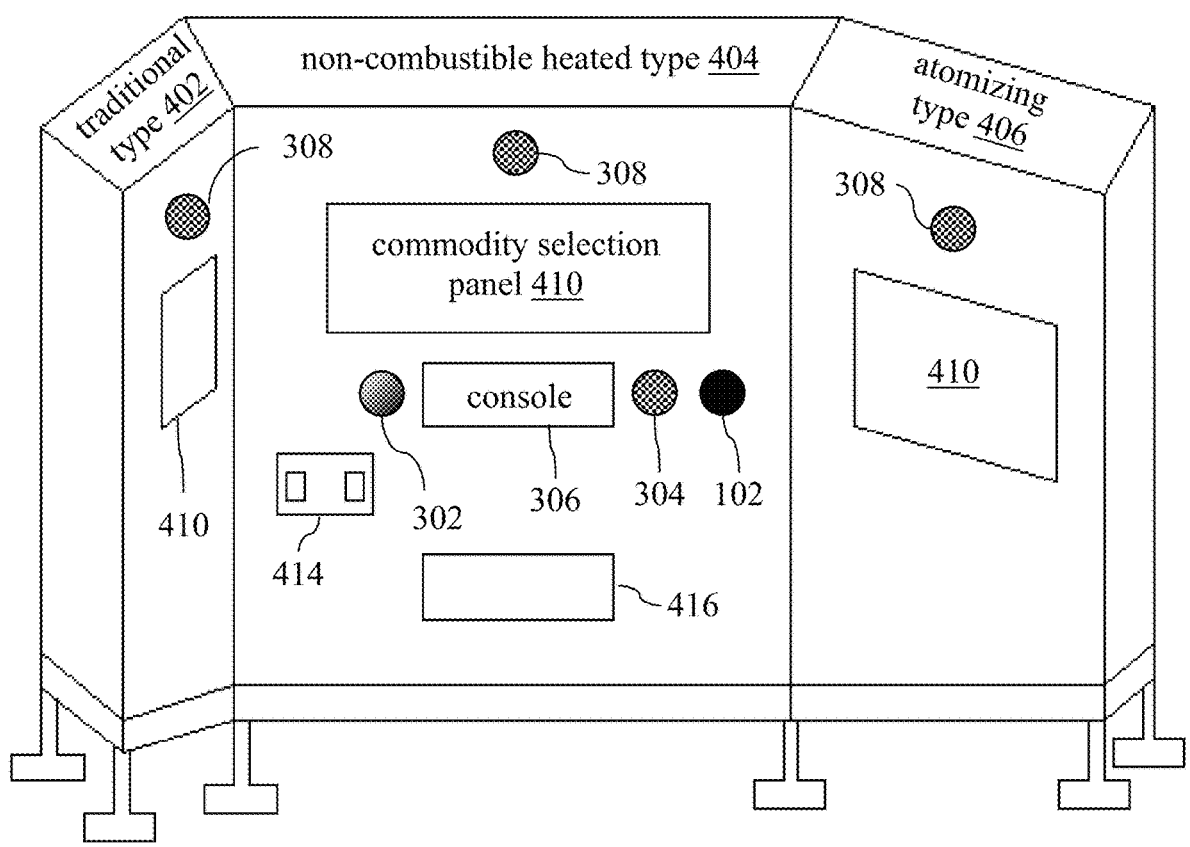
FIG. 4 shows a diagram of a cigarette vending machine according to an embodiment of the application.

FIG. 4 shows a diagram of a cigarette vending machine 400 according to an embodiment of the application. In FIG. 4, a cigarette vending machine 400 is a multi-type composite vending machine, comprising a plurality of machine bodies. Each machine body is electrically connected to the control module 210. The restricted commodities in the foregoing embodiments may further include multiple types, and the restricted commodities of each type are stored in different machine bodies. In FIG. 4, for example, a cigarette vending machine 400 may provide a variety of types of commodities, for example: traditional type, non-combustible heated type and atomizing type. Furthermore, the cigarette vending machines 400 may also sell other commodities, such as beverages, chewing gum, snacks and so on. Nevertheless, the embodiment of the vending machine 400 is particularly designed to facilitate sales of age restricted commodities.

For example, the cigarette vending machine 400 can be equipped with at least 4 sets of multi-functional sensors 302. FIG. 4 shows only one sensor 302 as a representative for easy demonstration, though, the actual number of sensors 302 and layout is not constrained by the figure of the embodiment, wherein any feasible variation in design is allowed. Each sensor 302 is configured to sample the user biometric characteristics, such as facial characteristics, within a range of 3 meters. Through software algorithms, the embodiment can realize automatic face tracking in a range of 3 to 5 meters. The images sampled by the sensor 302 can be uploaded within 5 seconds to the central system, such as the customer service system 130 or the public security system 140 in FIG. 1. The customer service system 130 may belong to a cigarette administrative authority or a unit of a manufacturer. In the central system, there is a pre-established database, comprising user profiles including the faces, ID numbers and corresponding ages. After comparing the uploaded facial images, the central system can return a comparison result, so that the cigarette vending machine 400 can determine whether the cigarette can be sold to the current user.

In one embodiment, the commodity selection panel 410 on the cigarette vending machine 400 may be a liquid crystal display or light emitting diode display same as the display 310 in FIG. 2, displaying available commodities for users to choose. Only when a user is determined qualified to buy cigarettes, the commodity selection panel 410 displays cigarettes in the commodity menu for user selection. In a further embodiment, since alcoholic beverages are also age-restricted commodities, the embodiments can be extended to alcoholic beverages, not limited to cigarettes.

In the embodiment of cigarette vending machine 400, different types of commodities can be displayed separately in different commodity selection panels 410. For example, the traditional type 402, the non-combustible heated type 404, and the atomizing type 406. The user may first select a favorite brand, and based on which, the commodity selection panel 410 displays a variety of flavors in the brand for further selection.

On the other hand, when the user is underage and unqualified to buy age restricted commodities, the commodity selection panel 410 may only display unrestricted commodities for all ages, such as drinks, snacks and so on. In this way, the user may select one of the displayed commodities through a console 306. The console 306 can be a touch screen or a plate with mechanic buttons. In a further embodiment, the cigarette vending machine 400 may provide a microphone 304 for receiving voice commands from the user to realize a man-machine dialogue function. For example, the cigarette vending machine 400 may comprise a control module 210 and a processor 230 as shown in FIG. 2, for executing program codes 222 stored in the memory device 220 to recognize user speech command input via the console 306, so as to determine the user's selection on the commodities. Since the cigarette vending machine 400 may be placed in an outdoor noisy environment, the microphone 304 is not limited to one set in this embodiment, and it may be a microphone array comprising multiple sets of directional microphones and omni-directional microphones which can filter background noise in a noisy environment to clearly sample human speech. In a further implementation, one or more speakers 308 may be included in the cigarette vending machine 400 to directly interact with the user with sounds. The number and configuration of the speakers 308 in FIG. 4 are only exemplary, and the actual implementation can be arranged with any feasible variations not limited to those shown in the figure.

In a further embodiment, the cigarette vending machine 400 of FIG. 4 can implement customized services based on facial recognition. When the user uses the cigarette vending machine 400 more than once, the user can be automatically recognized, so that the user's favorite choice is automatically presented as a default selection based on statistics of past transaction records. More specifically, the cigarette vending machine 400 in FIG. 4 can also sample the user's vocal characteristics or other biometric characteristics associated with the facial characteristics, and store the aforementioned characteristics in the database of the central system. This helps strengthening the accuracy of identification in future transactions. The user's transaction records can also be retained in the cigarette vending machine 400 for big data analysis. According to the user's transaction record, the user's frequent selections, or a new commodity that may suit the user's favorite taste, can be automatically displayed in the menu for a regular user who uses the cigarette vending machine 400 multiple times. In other words, an intelligent marketing analysis function is implemented in the cigarette vending machine 400, which can also provide customized preferential policies for specific users. For example, the cigarette vending machine 400 can recommend new commodity under promotion according to personal taste preferences, and offer free gifts, such as a cigarette capsule.

The user can make payments through the payment module 414. The payment module 414 of the embodiment supports contactless payment, for example, wireless technologies such as Bluetooth, wireless network, NFC, RFID and other contactless protocols may be employed to conduct transactions with the user's mobile device, IC card or proximity card. The payment module 414 also supports online electronic payment, using barcode scanning applications such as WeChat, Alipay, UnionPay and other APPs. For users who have only traditional cash, the payment module 414 can also provide traditional coin or paper cash payment. When the payment is successfully performed, the selected cigarette is provided from the cigarette exporting gate 416, allowing the user to take.

As a further value adding service, the cigarette vending machine 400 also provides a voice-controlled cigarette heater function, allowing the purchased cigarette to be instantaneously unboxed and ignited. For example, a cigarette heater module 102 is designed on the cigarette vending machine 400. When the user completes the transaction, the cigarette vending machine 400 can be instructed to activate the cigarette heater module 102 through the console 306 or voice commands, helping the user to ignite or heat the cigarette commodity just acquired. To achieve the embodiment, the microphone 304 can also be configured to receive the user's voice command about igniting a cigarette. A specific implementation of the cigarette heater module 102 may adapt the design of existing car cigarette lighters with customized modification and integration.

Further, a communication module 200 (as shown in FIG. 2) is built in the cigarette vending machine 400, which can be connected to the central system through a wireless network or a wired network. The inventory module 500 (as shown in FIG. 2) in the cigarette vending machine 400 is responsible for monitoring commodities in stock. According to the proposed design, the vendors can remotely monitor the commodities in the cigarette vending machine 400 through applications, so as to schedule the replenishment plan in advance.

Since the cigarette vending machine 400 is designed to be placed around every corner of the city, usually in an outdoor environment, it can be equipped with a waterproof function such as IP68, so that the cigarette vending machine 400 is suitable for various indoor and outdoor working environments. On the other hand, since the cigarette vending machine 400 is usually unattended, an anti-theft function must be in place. When sabotage is detected, the cigarette vending machine 400 sends an alert signal to advise the spoiler by the commodity selection panel 410 and the speaker 308, and the communication module 200 transmits a call for help to the security system 140.

In a conventional vending machine, the commodity selection panel 410 is not presented in a display, but rather a physical commodities reservoir windows, incorporated with light boards to display selectable items. Even in such a conventional mechanic architecture, the embodiments of the vending method are also applicable.

Generally, the production date plus the shelf life equals to the expiration date. Regarding the expiration date control of the commodities, each commodity in the cigarette vending machine 400 can present the expiration information on the box in a form of barcodes. In the inventory module 500, the monitor module 510 may identify some of the bar code at the time of commodity refilling, so as to build a file in the memory device 220. The maintainer may also be allowed to remotely check the statuses of production dates and shelf lives through the app. As long as the commodity is still within the effective date, the commodity can be sold normally. When a commodity in the inventory module 500 is expired, the cigarette vending machine 400 may suspend the vending service, and inform the customer service system 130 through the communication module 200 to schedule a maintenance. Another way to deal with the expired commodity is to transport the expired commodity to a destruction module 540 by the provision module 530. The destruction module 540 may be a recalling bin, a paper shredder, or a miniature incinerator. The monitor module 510 can also monitor the remaining commodities to ensure sufficient surpluses for all brands. For example, the monitor module 510 may comprise a microcontroller connected to a memory device and a counter, executing a software program to memorize the remaining quantity and expiration dates of each commodity. Although the embodiments of the present invention describe these functions in a modular manner, it is understandable that the implementations can be based on combinations of hardware and software.

With the embodiments described, a cigarette vending machine 400 can effectively prevent under-ages from buying cigarettes. Users can buy their favorite commodity according to their brand preferences and type preferences.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A vending machine for storing and selling commodities, comprising:
   a control module, comprising a processor executing program codes to provide a vending service;
   a user interface, connected to the control module, comprising a sensor sampling biometric characteristics of a user, and the user interface is configured by the control module for accepting a selection signal for selecting one of the commodities displayed on a commodity menu;
   a communication module, connected to the control module, comprising a wireless transceiver, wherein the communication module is configured to receive commands from the control module, and communicate with a central system or the user; wherein:
   the control module is configured to drive said sensor to capture the biometric characteristics of the user, and upload the biometric characteristics to the central system through the communications module, wherein the central system comprises a database storing associations of biometric characteristics and identity characteristics corresponding to one or more users; and
   the control module is configured to receive, through the communication module, a search result from the database based on the biometric characteristics of the user, to determine commodities authorized for sale; wherein:
   the control module is configured to determine, according to the search result, whether an identity characteristic corresponding to the biometric characteristics of the user satisfies a first condition;
   when the identity characteristic satisfies the first condition, the control module is configured to generate a command to display a commodity menu with the restricted commodity; and
   when the identity characteristic is undeterminable or does not satisfy the first condition, the control module is configured to display the commodity menu without the restricted commodity.

2. The vending machine as claimed in claim 1, wherein the user interface further comprises a display, a microphone, a console, and a speaker.

3. The vending machine as claimed in claim 2, wherein:
   the user interface further comprises a microphone, and the sensor comprises at least one of a camera, a scanner, and a fingerprint sensor;
   the biometric characteristics comprises facial images captured by the camera, retinal images acquired by the scanner, fingerprints sampled by the fingerprint sensor, or voice sampled by the microphone;
   the identity characteristics comprise age of users; and
   the first condition comprises an age of the user being greater than or equal to a certain threshold.

4. The vending machine as claimed in claim 1, further comprising:
   an inventory module, connected to the control module, adaptable to manage storage, expiration dates and provision of the commodities;
   a cash management module, connected to the control module, adaptable to manage storage, reception and return of cash; wherein when the user interface receives a selection signal, the control module initiates a payment process to receive a payment corresponding to the selection signal via the communication module or the cash management module; and
   upon successful conclusion of the payment, the control module instructs the inventory module to provide commodities selected by the selection signal.

5. The vending machine as claimed in claim 4, wherein:
   the inventory module is adaptable for checking remaining commodities in stock; and
   the control module is adaptable for determining whether a number of the remaining commodities is lower than a threshold, and sending a low inventory notification to the central system through the communication module when a number of the remaining commodities is lower than a threshold.

6. The vending machine as claimed in claim 4, wherein:
   the inventory module is adaptable for tracking expiration dates of the commodities in stock; and
   when one of the commodities is expired, the control module is adaptable for suspending the vending service in the vending machine or recalling the one of the commodities.

7. The vending machine as claimed in claim 1, wherein the communication module is configured to transmit the selection signal back to the database of the central system, to be associated with the biometric characteristics as a basis for the central system to perform big data analysis, and the central system comprises at least one of a customer service system or a public security system.

8. The vending machine as claimed in claim 1, wherein:
   the control module is configured to detect alerts generated from problematic payments or module damage, and send a warning notification to the central system when the alerts are detected.

9. The vending machine as claimed in claim 1, wherein the control module further comprises a memory device, storing associations of the biometric characteristics and the selection signal on the commodities.

10. The vending machine as claimed in claim 1, wherein:
    the communication module is in compliance with at least one of the following communication protocols: Bluetooth, Wireless Local Area Network, Near Field Communication, and Radio Frequency Identification; and
    the control module is configured to provide an electronic payment mode and a cash payment mode.

11. The vending machine as claimed in claim 1, further comprising a plurality of machine bodies, electrically connected to the control module; wherein:
    the commodities comprise restricted commodities, the restricted commodities comprise multiple types, and
    the multiple types of restricted commodities are respectively stored in the multiple machine bodies.

12. The vending machine as claimed in claim 11, further comprising a heater, controlled by the control module, wherein when the control module generates a command to provide the restricted commodity, the control module activates the heater to heat the restricted commodity.

13. A vending method for a vending machine, wherein the vending machine stores and sells commodities, and the vending method comprises:
    receiving a selection signal for selecting and purchasing one of the commodities displayed on a commodity menu;
    sampling biometric characteristics of a user entering the selection signal; and uploading the biometric characteristics to a central system, wherein:

the central system comprises a database storing associations of biometric characteristics and identity characteristics corresponding to one or more users;

the control module is configured to receive, through the communication module, a search result of searching the database by the central system according to the biometric characteristics, to determine commodities authorized for sale; wherein:

determination of commodities authorized for sale comprises, receiving the search result to determine whether an identity characteristic corresponding to the biometric characteristics of the user satisfies a first condition;

when the identity characteristic satisfies the first condition, the control module generating a command to display the commodity menu with a restricted commodity; and when the identity characteristic is undeterminable or does not satisfy the first condition, the control module is configured to display the commodity menu without the restricted commodity.

14. The vending method as claimed in claim 13, wherein:
the biometric characteristics comprise at least one of facial images, voice, retinal images and fingerprints of the user;
the identity characteristics comprise ages of users; and
the first condition comprises an age of the user being greater than or equal to a certain threshold.

15. The vending method as claimed in claim 13, further comprising:
transmitting the selection signal to the database of the central system, to be associated with the biometric characteristics as a basis for the central system to perform big data analysis;
wherein the central system comprises at least one of a customer service system or a public security system.

16. The vending method as claimed in claim 13, wherein:
the vending machine comprises a plurality of machine bodies, electrically connected to the control module;
the restricted commodities comprise multiple types, and
the multiple types of restricted commodities are respectively stored in the multiple machine bodies.

* * * * *